United States Patent
Ciarlini et al.

(10) Patent No.: US 11,120,174 B1
(45) Date of Patent: Sep. 14, 2021

(54) METHODS AND APPARATUS FOR EVALUATION OF COMBINATORIAL PROCESSES USING SIMULATION AND MULTIPLE PARALLEL STATISTICAL ANALYSES OF REAL DATA

(71) Applicant: EMC IP Holding Company LLC, Hopkinton, MA (US)

(72) Inventors: Angelo E. M. Ciarlini, Rio de Janeiro (BR); Vinícius Michel Gottin, Rio de Janeiro (BR); Rodrigo de Souza Lima Espinha, Rio de Janeiro (BR); Adriana Bechara Prado, Rio de Janeiro (BR); Rodrigo Dias Arruda Senra, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 963 days.

(21) Appl. No.: 14/663,630

(22) Filed: Mar. 20, 2015

(51) Int. Cl.
*G06F 30/20* (2020.01)

(52) U.S. Cl.
CPC .................... *G06F 30/20* (2020.01)

(58) Field of Classification Search
CPC ............................ G06F 17/5009; G06F 30/20
USPC .......................................................... 703/6
See application file for complete search history.

(56) References Cited

U.S. PATENT DOCUMENTS

| | | | |
|---|---|---|---|
| 6,169,981 B1* | 1/2001 | Werbos | G05B 13/0265 706/15 |
| 2003/0065409 A1* | 4/2003 | Raeth | G05B 9/02 700/31 |
| 2006/0184564 A1* | 8/2006 | Castellanos | G06Q 10/04 |
| 2014/0365264 A1* | 12/2014 | Smiley | G06Q 10/06315 705/7.25 |
| 2017/0076256 A1* | 3/2017 | Castel | G06Q 50/01 |

OTHER PUBLICATIONS

Horne et al., "Data Farming: Discovering Surprise,"Proceedings of the 2004 Winter Simulation Conference, R. G. Ingalls, M. D. Rosetti, J.S. Smith, and B. A. Peters, eds. (2004).

(Continued)

*Primary Examiner* — Andre Pierre Louis
(74) *Attorney, Agent, or Firm* — Ryan, Mason & Lewis, LLP

(57) ABSTRACT

Methods and apparatus are provided for evaluating combinatorial processes using simulation techniques and multiple parallel statistical analyses of real-world data. A simulation model is generated that simulates one or more steps of a combinatorial process. The simulation model comprises key features of the combinatorial process. A plurality of first data mining tasks are performed in parallel over real data of the combinatorial process to obtain key feature prediction models that estimate the key features. The key feature prediction models are bound to the simulation model. Query types to be supported are identified and a plurality of simulation runs are generated in parallel, comprising simulated data for the supported query types. A plurality of second data mining tasks are performed in parallel over the plurality of simulation runs to build global prediction models to answer queries of each supported query type. An answer to a user query is determined using the global prediction models.

20 Claims, 13 Drawing Sheets

(56) References Cited

OTHER PUBLICATIONS

Wil Van Der Aalst, "Process Mining: Overview and Opportunities", ACM Transactions on Management Information Systems, vol. 99, No. 99, Article 99 (Feb. 2012).

Van Der Aalst et al., "Workflow mining: A survey of issues and approaches", Data and Knowledge Engineering 47, pp. 237-267 (2003).

\* cited by examiner

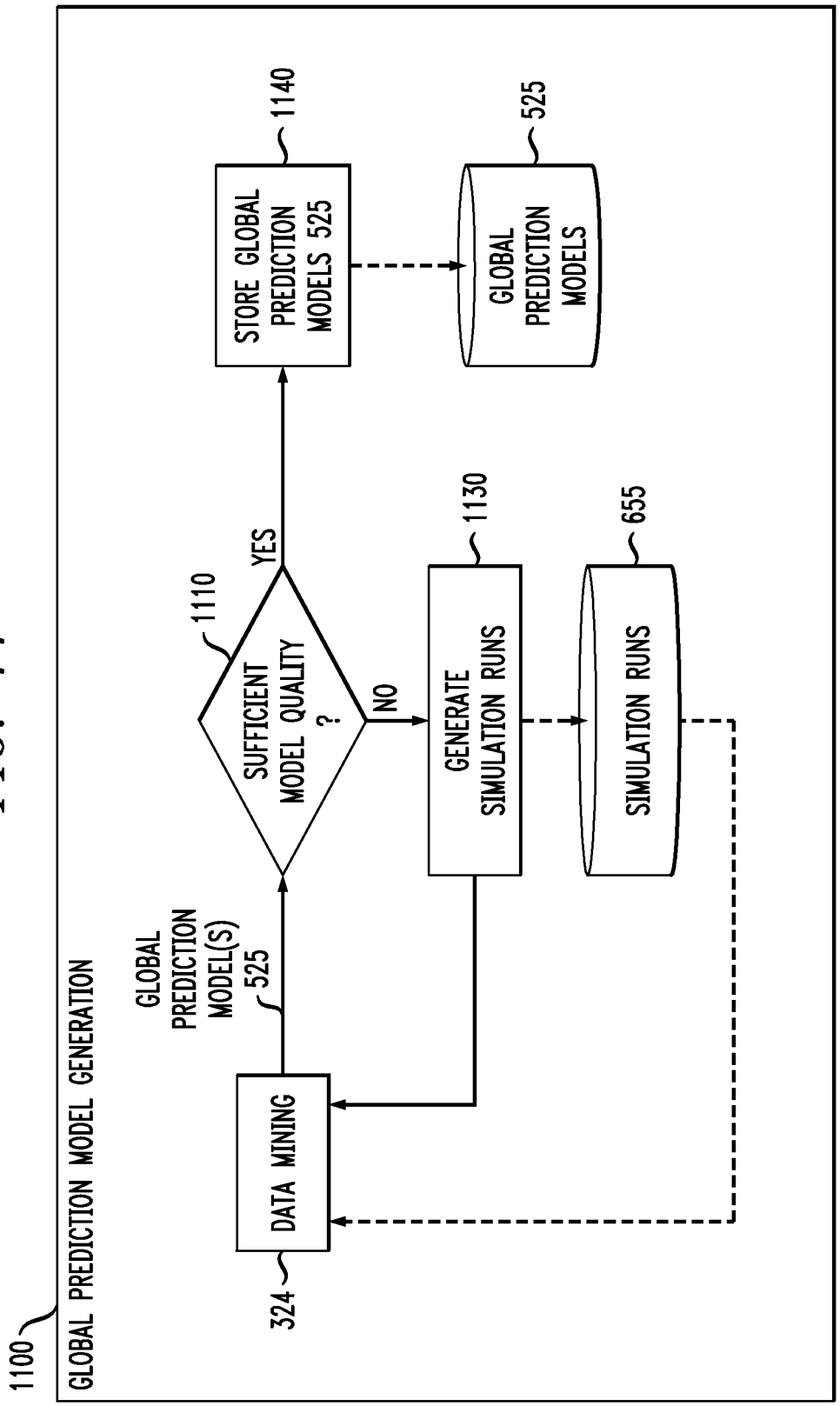

1600

METHODS AND APPARATUS FOR EVALUATION OF COMBINATORIAL PROCESSES USING SIMULATION AND MULTIPLE PARALLEL STATISTICAL ANALYSES OF REAL DATA

FIELD

The field relates generally to evaluation of combinatorial processes, such as logistics processes.

BACKGROUND

Combinatorial processes usually have many sub-processes and multiple variables related to each sub-process. Examples of processes with a clear combinatorial nature are often referred to as complex systems. The prediction of the global behavior of such systems tends to be very difficult due to the combinatorial explosion of multiple states that can occur. Complex systems can be found in Engineering, Economics, Biology and other areas. Systems that correspond to the integration of various logistics processes are good examples of complex systems that have a strong combinatorial nature. Logistics processes are generally associated with the management of a flow of resources between an origin and a point of consumption in order to meet one or more requirements. The managed resources can include physical items, such as equipment, materials and food, as well as intangible items, such as information, time and energy.

Statistical analysis of real-world data and simulation techniques are often employed to understand and improve the management of various processes. Statistical analysis reveals the quality of a given process by means of comprehensive reports about the past, while simulations are useful to predict and examine unforeseen critical situations.

The constant evolution of monitoring and simulation techniques of processes generates ever-increasing amounts of data. This tends to become even more dramatic when it is necessary to evaluate combinatorial processes, such as those found in logistics processes. Due to this large data volume, traditional approaches may suffer from excessively long execution times and, consequently, fail to provide relevant answers to decision makers in a reasonable time frame. In addition, large sets of collected information might be discarded or disregarded in order to keep a tractable data volume.

A need exists for improved techniques for evaluating combinatorial processes using simulation techniques and multiple parallel statistical analyses of real-world data. A further need exists for a combinatorial process evaluation framework that provides query-oriented execution of simulations within a massively parallel processing (MPP) environment.

SUMMARY

Illustrative embodiments of the present invention provide methods and apparatus for evaluating combinatorial processes using simulation techniques and multiple parallel statistical analyses of real-world data. In one exemplary embodiment, a simulation model is generated that simulates one or more steps of a combinatorial process. The simulation model comprises one or more key features of the combinatorial process. A plurality of first data mining tasks are performed in parallel over real data of the combinatorial process to obtain one or more key feature prediction models that estimate the one or more key features. The one or more key feature prediction models are bound to the simulation model. In addition, one or more query types to be supported are identified and a plurality of simulation runs are generated in parallel, comprising simulated data for the one or more supported query types. A plurality of second data mining tasks are performed in parallel over the plurality of simulation runs to build one or more global prediction models to answer queries of each of the one or more supported query types. An answer to a user query is determined using the one or more global prediction models.

In another exemplary embodiment, the generated one or more global prediction models must optionally satisfy one or more predefined quality criteria. The steps of generating, in parallel, a plurality of additional simulation runs and performing the plurality of second data mining tasks in parallel over the plurality of simulation runs are repeated until the one or more global prediction models satisfy the predefined quality criteria.

In yet another exemplary embodiment, a frequency that queries for each query type are executed is monitored and, when a frequency of a given query type without a corresponding prediction model exceeds a previously specified criteria, additional simulation runs are optionally generated and the plurality of second data mining tasks are performed in parallel over the plurality of additional simulation runs to obtain a global prediction model to answer queries of the given query type.

According to another aspect of the invention, a compatibility of key feature prediction models with the real data of the combinatorial process is monitored, and when one or more key feature prediction models are not compatible with the real data of the combinatorial process according to a predefined quality criteria, the following steps are re-executed: performing the plurality of the first data mining tasks in parallel over the real data of the combinatorial process to obtain the one or more key feature prediction models that estimate the one or more key features; binding the one or more key feature prediction models to the simulation model; generating, in parallel, a plurality of simulation runs comprising simulated data for the one or more supported query types; and performing the plurality of second data mining tasks in parallel over the plurality of simulation runs to build one or more global prediction models to answer queries of each of the one or more supported query types.

Advantageously, illustrative embodiments of the invention provide improved techniques for evaluating combinatorial processes. These and other features and advantages of the present invention will become more readily apparent from the accompanying drawings and the following detailed description.

BRIEF DESCRIPTION OF THE DRAWINGS

FIG. 11 is a flow chart illustrating an exemplary implementation of a global prediction model generation process that incorporates aspects of the invention;

DETAILED DESCRIPTION

Figure 1:
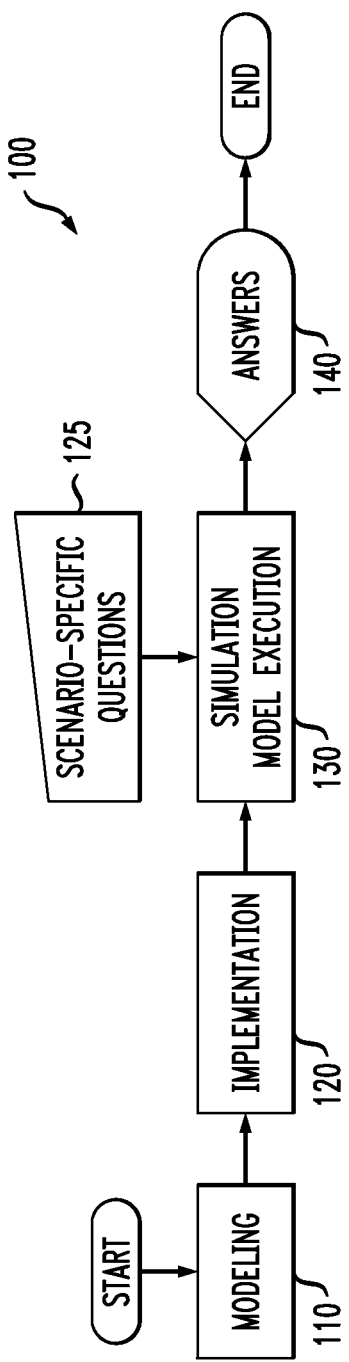
FIG. 1 is a flow chart illustrating an exemplary workflow for a conventional simulation-based approach for decision making support in the context of combinatorial processes.

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for combinatorial process management based on an integration of simulation techniques and multiple parallel statistical analyses of real-world data. According to one aspect of the invention, the disclosed combinatorial process evaluation framework provides query-oriented execution of simulations within a massively parallel processing environment. According to another aspect of the invention, a query-based framework provides answers to user-defined queries efficiently, automatically evaluating a trade-off between running new simulations on-the-fly and extracting information from precomputed data through data mining techniques or statistical analysis.

Aspects of the invention address the problem of predicting and evaluating future outcomes in combinatorial processes. While the exemplary framework is disclosed in the context of large scale logistics processes, the present invention may be applied to any system that has a combinatorial number of possible states.

As discussed hereinafter, an exemplary implementation of the invention generates a simulation model that simulates one or more steps of a combinatorial process. The simulation model comprises key features of the combinatorial process in question. A first plurality of data mining tasks is performed in parallel over real data of the combinatorial process in question. These tasks generate key feature prediction models that estimate values for the corresponding key features. The key feature prediction models are then bound to the simulation model.

In addition, the query types to be supported are identified, and then a plurality of simulation runs comprising simulated data for the supported query types are generated, in parallel. A second plurality of data mining tasks is performed in parallel over the plurality of simulation runs. These tasks generate global prediction models that answer queries of each of the supported query types. Finally, an answer to a user query can be determined using the global prediction models.

INTRODUCTION

Combinatorial processes management is a challenging task. In the case of logistics processes (especially in large scale operations areas, such as retail, aviation, construction, and oil and gas exploration), in order to reduce inventory costs and provide high levels of service, bottlenecks must be identified. Once the bottlenecks are identified, one is able to reduce order-to-delivery times (lead times), safety stock levels, and, consequently, improve resource utilization.

Combinatorial processes tend to be comprised of many sub-processes, each typically having a number of different possibilities and sources of uncertainty. Consequently, their optimization for all possible situations is typically hard to achieve. Given this scenario, tools to aid decision-making are essential to reduce the uncertainty, make wise decisions, and perform bottleneck detection. Such tools tend to resort either to simulation techniques or statistical analysis of real-world data.

For example, a logistics process for inventory management may have to balance a large number of customers, material types, orders, destinations, warehouses, delivery routes, transportation means, demands, suppliers, and supply policies. A failure to optimize such logistics processes can increase costs and impair quality of service and competitive advantage. Thus, it is important to provide valuable decision support and to obtain accurate results to complex queries quickly.

As processes become increasingly complex, the amount of data generated by simulation techniques tends to be very large, in particular when there are complex queries to be answered. Additionally, the amount of real-world data is increasing very quickly due to the level of automation and intense use of sensors. In this context, big data analytics and massively parallel processing are essential mechanisms to effectively and efficiently tackle problems involving large amounts of data.

According to one aspect of the invention, multiple parallel statistical analyses of real data are combined with simulation techniques to answer complex queries about combinatorial processes that evolve over a time horizon, such as logistics processes. In the context of logistics processes, for instance, aspects of the invention are able to address queries related to measurements of lead times and stock levels under different scenarios. More specifically, a general big data analytics framework, that is, a framework where multiple statistical analyses can be performed in parallel over a unique massive amount of data, is provided for predictive analytics and simulation of combinatorial processes, such as those targeted at large scale warehouse inventory management systems.

The exemplary framework is based on executions of a simulation model, which is captured from real-world data, within a massively parallel processing environment. The simulation model contains various key features, which are attributes from real-word data that are very likely to be influenced by several factors. Prediction models for these key features are constructed by the exemplary framework. These key feature prediction models are periodically refined by applying data mining to real-world data from a given combinatorial process. When such predictive models are incorporated into the simulation model, simulations for a large number of independent scenarios are carried out in parallel.

Global predictive models for generic parameterized queries are then precomputed over simulation results. When the user poses a query, the framework automatically decides either to apply one or more precomputed global predictive models, make statistical analysis over the precomputed data, or run a new set of simulations in order to statistically analyze their results.

According to another aspect of the invention, simulation and data mining tasks are performed within a massively parallel processing environment containing an MPP database and exploiting data locality. Simulations can be generated either within the database itself or generated in parallel outside of the database and loaded into the database. The predictive analytics tasks are executed within the MPP database, taking advantage of embedded parallel machine learning stored procedures. In the case when the simulations are directly generated within the MPP database, specific stored procedures are also incorporated into the database to run the simulations.

Statistical Analysis of Real-World Data Vs. Simulation Techniques

Statistical analysis of real-world data and simulation techniques are often employed in many industries to improve combinatorial processes in organizations. In the case of logistics processes, both strategies are useful, e.g., to identify bottlenecks, increase service levels, and reduce inventory costs. Typically, however, tools to help decision makers understand complete processes tend to resort either to simulation techniques or to statistical analysis of (historical) real data. This choice brings several disadvantages, mainly related to the: (i) amount of data to deal with, (ii) time to process such a large volume of data, and (iii) highly dynamic nature of combinatorial processes.

FIG. 1 is a flow chart illustrating an exemplary workflow 100 for a conventional simulation-based approach for decision-making support. As noted above, many scenarios are often simulated to answer complex queries. As shown in FIG. 1, the exemplary workflow 100 for a conventional simulation-based approach comprises modeling the combinatorial process during step 110 and implementing the simulation model during step 120. The simulation model is executed during step 130 to obtain answers 140 to scenario-specific questions 125.

Generally, simulation techniques are effective when it is possible to create simulation models that accurately capture the most relevant features from the real-world processes, such as logistics processes. Creating such models demands extensive knowledge about the context so that different steps can be identified and the uncertainty related to each of them can be evaluated. In addition: (i) in order to provide useful answers to specific queries, it might be necessary to simulate many scenarios, by generating a large amount of simulation results that need to be stored and analyzed, (ii) depending on the query, it might take a long time to obtain the corresponding answer, and (iii) combinatorial processes usually have a highly dynamic nature, which means that the simulation models might need to be constantly adapted in order to reflect any change in the process in question.

Figure 2:
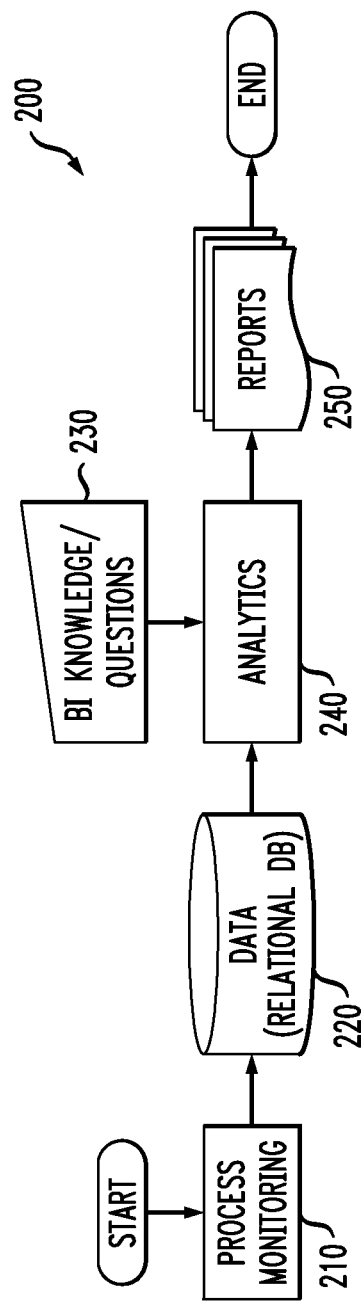
FIG. 2 is a flow chart illustrating an exemplary workflow for a conventional analytics-based approach for decision making support in the context of combinatorial processes.

FIG. 2 is a flow chart illustrating an exemplary workflow 200 for a conventional analytics-based approach for decision making support. As shown in FIG. 2, the exemplary workflow 200 for a conventional analytics-based approach initially perfoms process monitoring during step 210 to obtain real-world data stored in a relational database 220. Analytic techniques are applied during step 240 to generate reports 250 based on business intelligence (BI) knowledge and questions 230.

Generally, statistical analysis of (historical) real data is useful for generating comprehensive reports about the past of combinatorial processes. In the case of logistics processes, by measuring key features, such as lead times and stock levels, it is possible to evaluate the quality of the process in question. However, (i) the amount of real-world data is increasing very quickly due to the level of automation and intense use of sensors, (ii) such a large amount of data may hinder the performance of such analysis, and (iii) since combinatorial processes have a highly dynamic nature, future situations may differ significantly from previously observed patterns. For instance, serious consequences of concomitant problems with suppliers could be completely ignored if such a combination has never occurred before; the effects of rare but critical events can therefore be overlooked.

Aspects of the present invention recognize that real-world data may cover the possible variations of specific parts of the combinatorial process under consideration but not of the whole process. For example, in the case of a logistics process, a shortage of a certain material might have happened at a specific point in time but never when a specific platform demands this specific material.

In addition, aspects of the present invention recognize that data mining of the real-world data can capture the variability within a specific sub-process. For example, in the case of a logistics process in the oil and gas industry, data mining allows prediction of the shortage of a specific material or a peak on demand of the same material by specific platforms as separated events. In the case when these events might influence each other and they have never happened yet together, the simple application of data mining is not sufficient to evaluate the probability of one event causing the other. Simulation allows complex queries to be answered, such as estimating the probability of two related events happening at the same time. Further, by mining simulation runs in advance, aspects of the present invention allow complex queries like this to be answered quickly, without the need to run new simulations.

Using Big Data Analytics and Simulation to Answer Complex Queries

Considering the big data nature of combinatorial processes, as well as their highly dynamic nature, aspects of the invention combine big data analytics and simulation techniques to answer complex queries about combinatorial processes. In particular, exemplary embodiments of the invention address three types of complex queries:

1. Evaluation of distribution probabilities for key variables (e.g., lead times and stock levels, in the context of logistics processes) either given a specific scenario or considering all possible scenarios;
2. Evaluation of the probability of events (e.g., shortage of materials or bottlenecks, in the context of logistics processes);
3. Evaluation of probabilistic temporal logic and causality between events (e.g., consequences of "what-if" scenarios, such as changing stock reposition policies, or probability of delays or route interruption causing lead time deterioration for some item, in the context of logistics processes).

Figure 3:
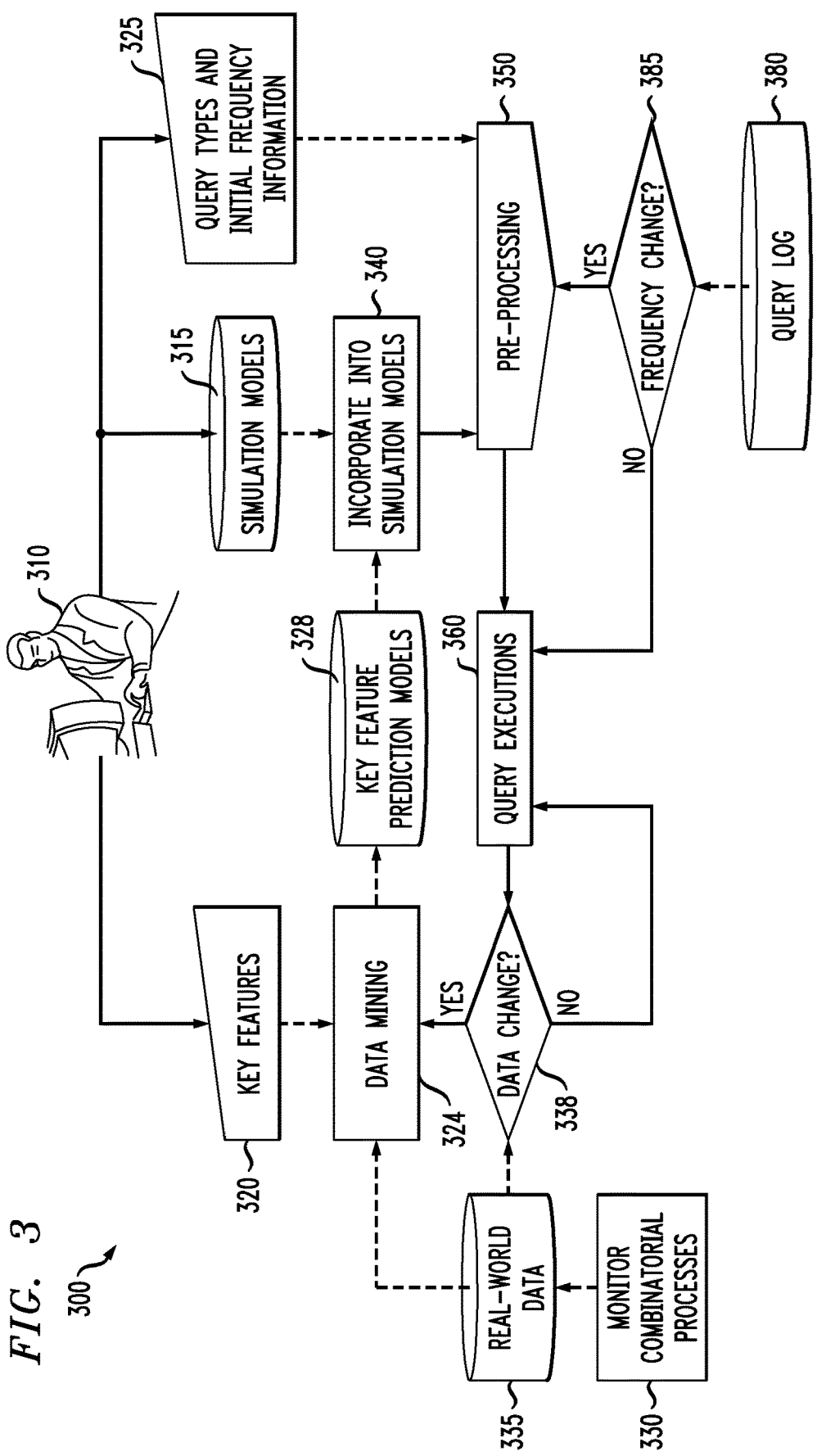
FIG. 3 is a flow chart illustrating an exemplary workflow that integrates simulations and big data analytics in accordance with aspects of the invention.

FIG. 3 is a flow chart illustrating an exemplary workflow 300 that integrates simulations and big data analytics in accordance with aspects of the invention. Big data analytics are applied to efficiently create various prediction models in parallel. A prediction model is a function that maps observed variables to a target value (the value to be predicted). Prediction models are usually created by using machine learning techniques. Aspects of the present invention employ prediction models for two different purposes: the key feature prediction models 328 discussed further below in conjunction with FIG. 4 and the global prediction models 525 discussed below in conjunction with FIG. 5.

As shown in FIG. 3, a modeler 310 defines one or more simulation models 315. As discussed further below in conjunction with FIG. 4, simulation models 315 are captured from real-world data. Generally, the simulation models 315 comprise one or more algorithmic models, such as system dynamics models and discrete-events models, which can emulate real-world processes.

As discussed further below in conjunction with FIG. 4, key features 320 of the simulation models 315 (e.g., measured times) are identified and explicitly stored into the MPP database, becoming available as input for key feature prediction models 328 following a parallel data mining process 324, discussed further below. Generally, the key features 320 are a distinctive subset of attributes from a real-world process that are very likely to be influenced by several factors, such as duration of each step in a logistics process. As shown in FIG. 3, the exemplary framework monitors combinatorial processes 330 and generates real-world data 335. Real-world data 335 of the processes 330 are constantly collected and inserted into the MPP database. Real-world data 335 comprises data that is collected by tracking the combinatorial processes. In the case of logistics processes, such data might refer to timestamps related to the processing of each order or stock levels of each material at each point in time.

As noted above, the exemplary framework creates prediction models 328 for all key features. The real-world data 335 are mined in parallel at stage 324 in order to build prediction models that estimate key features 320 (e.g.: stock levels, time spent on steps, demand forecasts) of the processes in question. In the case of logistics processes, these key feature prediction models 328 might depend on, for example, seasonality, overall demand, or number of transportation resources. Big data analytics drives the selection of the relevant parameters for the key feature prediction models 328. The key feature prediction models 328 are incorporated into the simulation models at stage 340.

Query types 325 that the framework should address, and corresponding initial frequencies of each query type 325, are also specified. Each query to be executed should be an instance of one of these types 325 and the exemplary framework keeps track of how frequent each type of query is performed. Generally, a query type 325 is a template that defines a set of query instances to be answered by the disclosed framework, such as distribution probabilities of lead times or probabilities of shortage of a given material, in the case of logistics processes. A query instance specifies the parameters of a query type 325. In the case of distribution probabilities of lead times, the query instance could possibly specify the material and, optionally, constraints about the scenarios to be considered. The scenario corresponds to a specific situation of the modelled process.

As discussed further below in conjunction with FIGS. 5 and 6, the exemplary framework pre-processes simulations at stage 350. As discussed hereinafter, a representation of the simulation models 315 are fed to the simulation engine. The set of query types 325 is analyzed at the pre-processing stage 350 in order to identify how many simulation runs should be generated prior to supporting the answering queries at stage 360. A simulation run is one of the possible data outcomes of a simulation for a given period of time, taking into account a specific scenario.

According to one aspect of the invention, simulation runs are either generated within an MPP database or generated in parallel outside of the database and loaded into the MPP database. In the case where the simulation runs are generated within an MPP database, such simulation engine is built as an external plugin of the MPP database. The execution of the simulation engine will generate simulation results which, in turn, are stored into the MPP database. A loose coupling between the engine and the MPP database allows different instantiations of simulation techniques such as system dynamics, discrete event simulation or hybrid approaches.

The frequencies of answered queries are constantly updated and recorded in a query log 380. If it is determined during step 385 that the frequency of a certain query type 325 changes substantially, program control returns to the pre-processing stage 350.

As discussed further below in conjunction with FIG. 5, big data analytics are used to create global prediction models from the simulation results. The quality of global prediction models is automatically evaluated using any model quality evaluation metric, such as accuracy, precision, or recall. For example, if the desired accuracy is not achieved, new simulation runs are generated and the data mining step is executed again. The loop ends when the desired level of quality is achieved. The resultant global prediction models are stored to be used during the execution of queries.

A test is performed during step 338 to determine if real-world data has been added, removed, or changed. If it is determined during step 338 that the real-world data has changed in such a way that current key feature prediction models are no longer valid, then program control returns to step 324 to create key feature prediction models 328. Otherwise, query executions may continue during step 360, discussed below.

Figure 4:
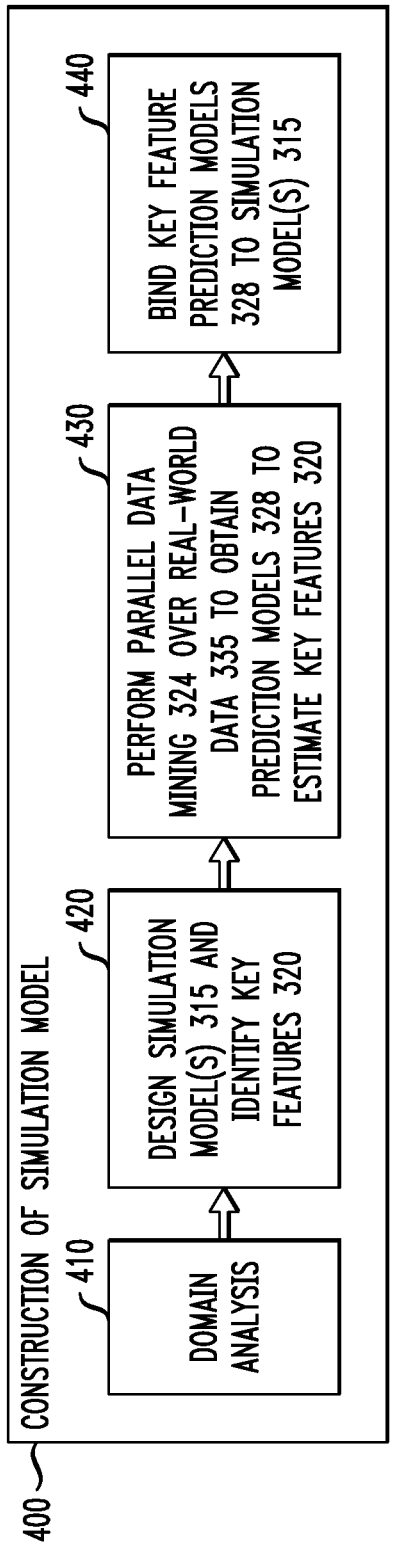
FIG. 4 is a flow chart illustrating an exemplary workflow that constructs the simulation models of FIG. 3 in accordance with aspects of the invention.

FIG. 4 is a flow chart illustrating an exemplary workflow 400 that constructs the simulation models 315 of FIG. 3 in accordance with aspects of the invention. As shown in FIG. 4, a domain analysis is initially performed during step 410, which may include, for example, interviews and analysis of the real-world data 335, identification of the main steps of the process under consideration, a definition of the query types 325, which the simulation model 315 should address, and the estimated frequencies of the query types 325.

The simulation model 315 is built during step 420 from the identified main steps of the processes in question and the key features 320 of the main steps (e.g., their duration) are identified. During step 430, parallel data mining 324 is performed over the real-world data 335 to obtain the prediction models 328 to estimate key features 320. Key feature prediction models 328 are incorporated into or bound to the simulation model 315 during step 440 so as to make it tightly coupled with reality. As discussed hereinafter, the resultant combined model is fed to a simulation engine.

Figure 5:
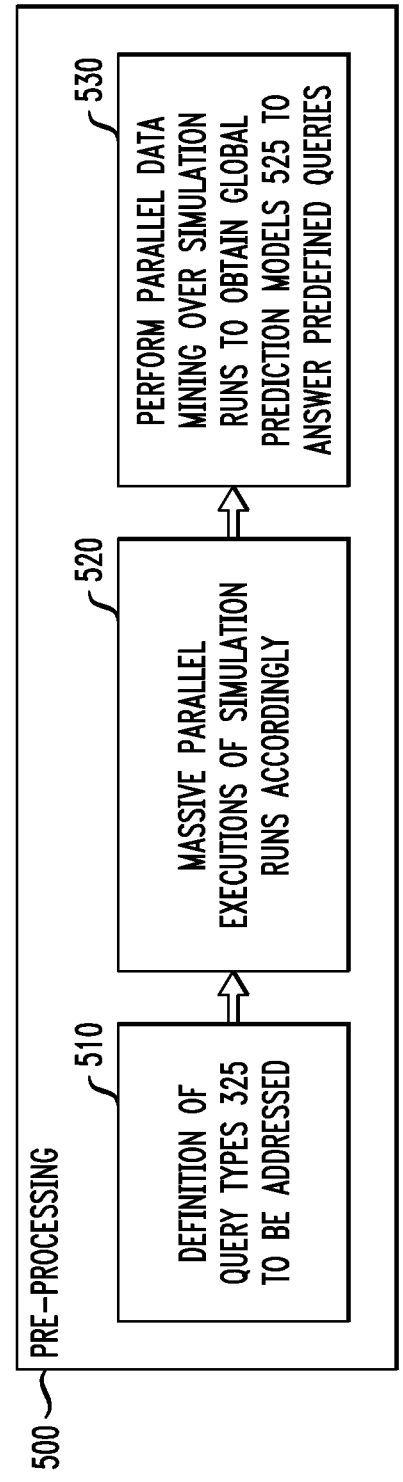
FIG. 5 is a flow chart illustrating an exemplary workflow that implements the exemplary pre-processing stage of FIG. 3 in accordance with aspects of the invention.

FIG. 5 is a flow chart illustrating an exemplary workflow 500 that implements the exemplary pre-processing stage 350 of FIG. 3 in accordance with aspects of the invention. As shown in FIG. 5, an exemplary set of query types 325 to be addressed is defined during step 510. Generally, each query to be executed should be an instance of a previously defined query type 325.

Simulation runs are executed in parallel during step 520 to support the answering of queries at stage 360 and stored into an MPP database. As noted above, a simulation run is one of the possible data outcomes of a simulation for a given period of time, taking into account a specific scenario.

Parallel data mining is then performed during step 530 over the executed simulation runs to create global prediction models 525 to answer queries of the predefined query types 325.

Figure 6:
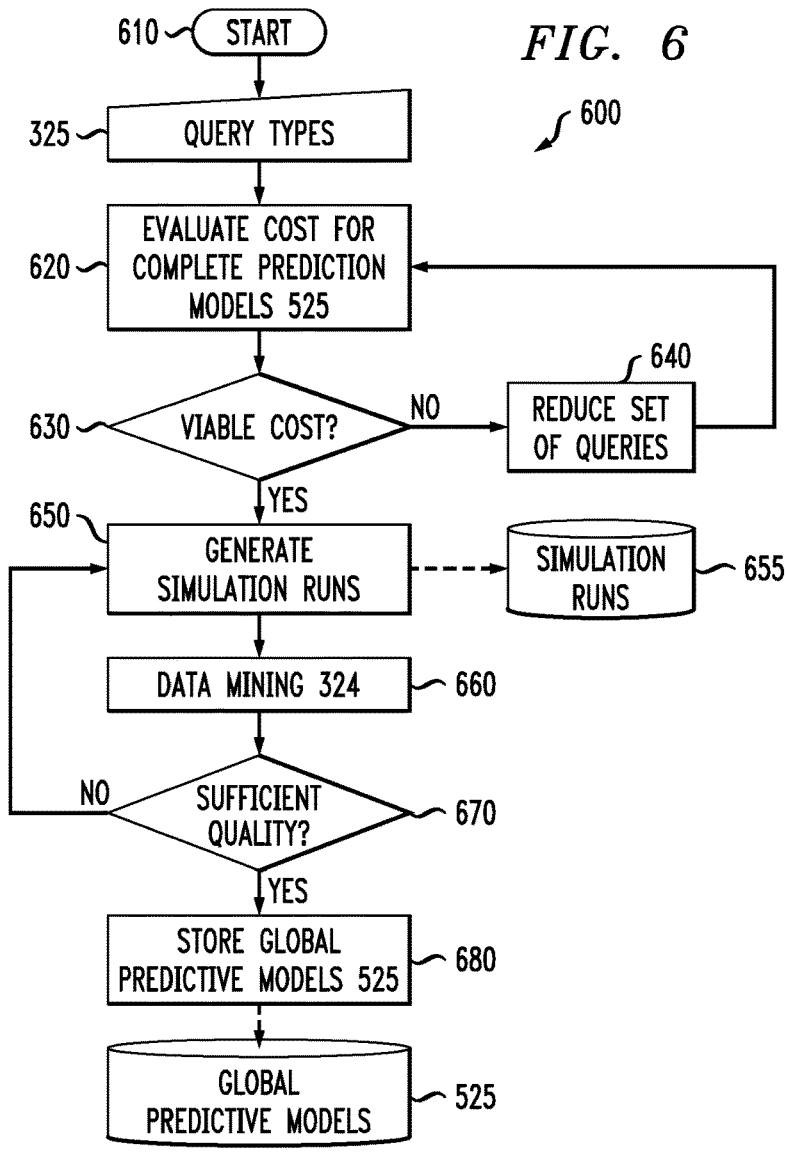
FIG. 6 is an implementation of the exemplary pre-processing workflow of FIG. 5.

FIG. 6 is an implementation of the exemplary pre-processing workflow 500 of FIG. 5. As shown in FIG. 6, the predefined query types 325 are obtained during step 610, and the cost for generating the global prediction models 525 is evaluated during step 620. A test is performed during step 630 to determine if the cost with the current set of predefined query types 325 is viable. If it is determined during step 630 that the cost is not viable, then the current number of predefined query types 325 is reduced during step 640.

If, however, it is determined during step 630 that the cost is viable, then the simulation runs 655 are generated and stored during step 650. Parallel data mining 324 over the simulation runs 655 is performed during step 660 and a further test is performed during step 670 to determine if the quality satisfies a predefined quality threshold. If it is determined during step 670 that the quality does not satisfy a predefined quality threshold, then additional simulation runs 655 are generated and stored during step 650, and the data mining 325 and quality evaluation 670 are repeated.

If, however, it is determined during step 670 that the quality satisfies a predefined quality threshold, then the global prediction models 525 are stored during step 680.

Figure 7:
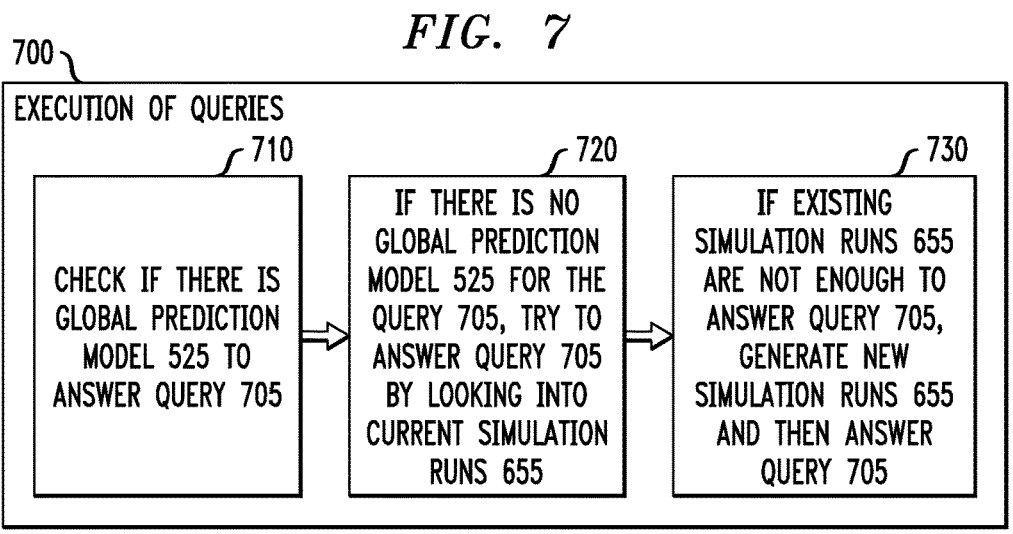
FIG. 7 is a flow chart illustrating an exemplary workflow that implements an execution of queries in accordance with aspects of the invention.

FIG. 7 is a flow chart illustrating an exemplary workflow 700 that implements an execution of queries in accordance with aspects of the invention. For example, the user 310 can initiate the execution of queries by the disclosed framework. As shown in FIG. 7, the exemplary workflow 700 initially checks if there is global prediction model 525 to answer a presented query 705 during step 710.

If there are already global prediction models 525 to answer the query, the applicable global prediction models 525 are applied to answer the query 705.

If there are no applicable global prediction models 525 to answer the query 705, the exemplary workflow 700 evaluates during step 720 whether there are simulation runs 655 to support the query 705. If there are simulation runs 655 to support the query 705, the framework tries to answer the query 705 by statistically analyzing current simulation runs 655. Additionally, the framework increases frequency of the corresponding query type 325 so as to evaluate whether pre-computing a global prediction model 525 to answer future queries of the same query type 325 would be advantageous.

If there are no (or few) simulation runs 655 to answer the query, a set of new (or additional) specific simulation runs 655 is generated during step 730, and then statistical analysis is performed to answer the query 705. Again, the framework increases the frequency of the corresponding query type 325 so as to evaluate whether pre-computing a global prediction model 525 to answer future queries of the same type would be beneficial.

Figure 8:
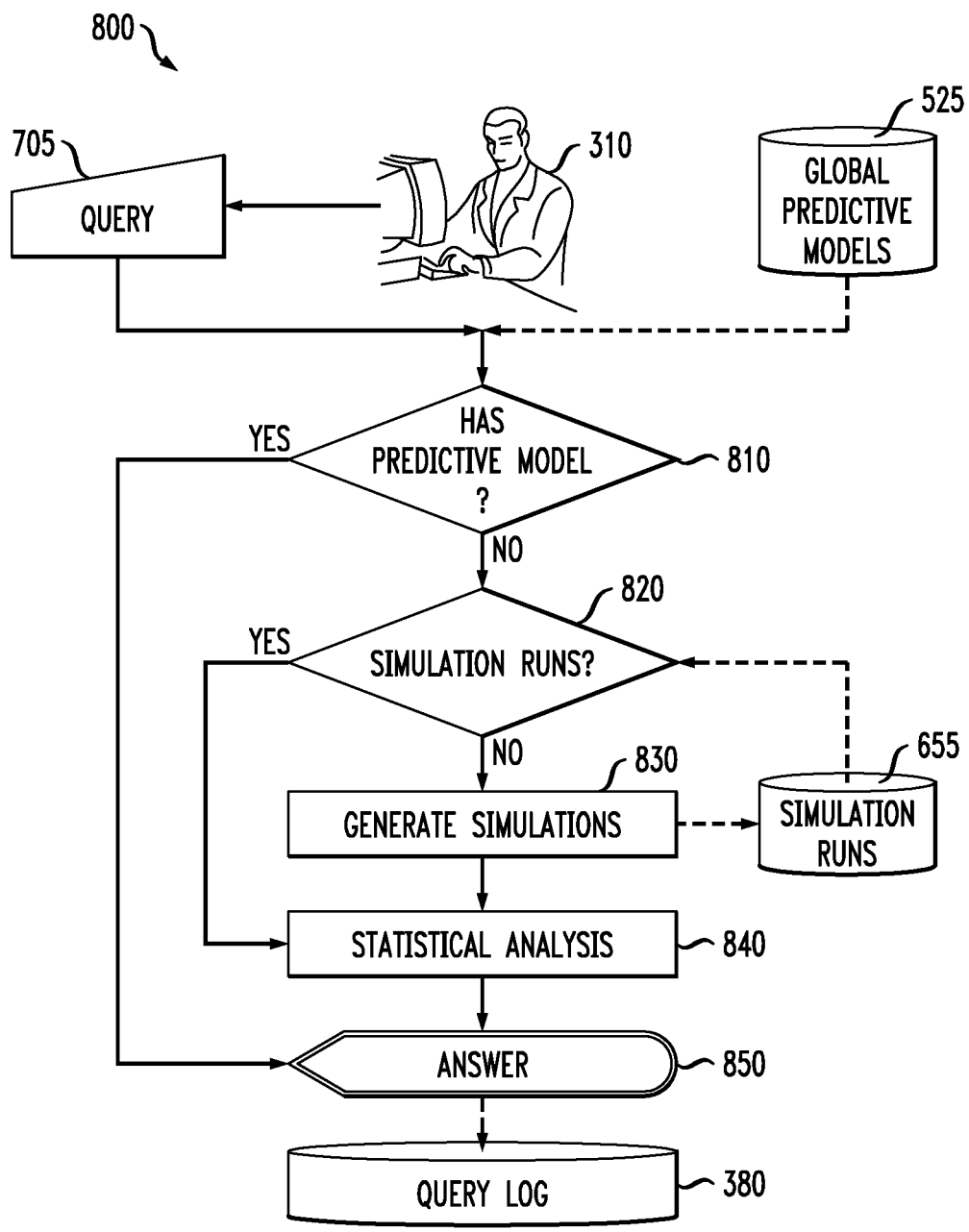
FIG. 8 is a flow chart of an exemplary implementation of the query execution process that implements the workflow of FIG. 7.

FIG. 8 is a flow chart of an exemplary implementation of the query execution process 800 that implements the workflow 700 of FIG. 7. As shown in FIG. 8, a user presents a query 705, and a test is performed during step 810 to determine if there is global prediction model 525 to answer the presented query 705. If it is determined during step 810 that there is a global prediction model 525 to answer the presented query 705, then the applicable global prediction model 525 is applied to answer the query 705 during step 850. The frequency of the corresponding query is updated in the query log 380

If, however, it is determined during step 810 that there is not a global prediction model 525 to answer the presented query 705, then a further test is performed during step 820 to determine whether there are simulation runs 655 to support the query 705. If it is determined during step 820 that there are simulation runs 655 to support the query 705, then the current simulation runs 655 are statistically analyzed during step 840 to answer the query 705 during step 850.

If, however, it is determined during step 820 that there are no (or few) simulation runs 655 to support the query 705, then a set of new (or additional) specific simulation runs 655 is generated during step 830 and then statistical analysis is performed during step 840 to answer the query 705 during step 850.

Figure 9:
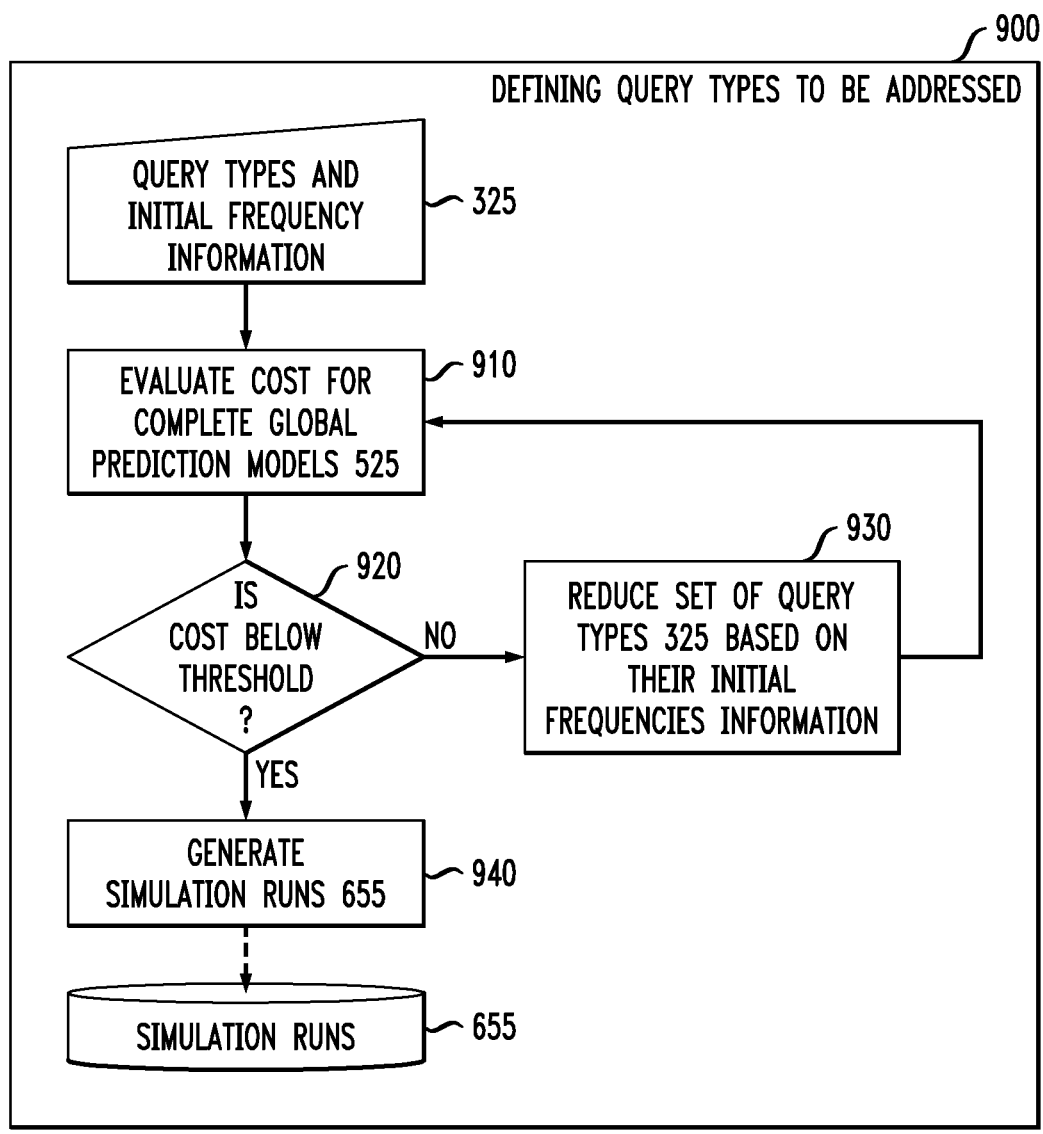
FIG. 9 is a flow chart illustrating an exemplary implementation of a query type definition process that incorporates aspects of the invention.

FIG. 9 is a flow chart illustrating an exemplary implementation of a query type definition process 900 that incorporates aspects of the invention. Generally, the exemplary query type definition process 900 analyzes the predefined query types 325 in order to identify the number of simulation runs 655 to be generated. As shown in FIG. 9, the cost for generating the simulation runs that support the complete global prediction models 525 for the current set of query types 325 is evaluated during step 910. A test is performed during step 920 to determine if the cost exceeds a predefined threshold. If it is determined during step 920 that the cost exceeds a predefined threshold, then the current set of query types 325 is reduced during step 930, for example, based on their initial frequencies information and a reevaluation is performed during step 910. In this manner, the decision of the query types 325 to be excluded depends on how often the framework expects the query types 325 to be executed (frequencies are initially defined by the user 310).

If, however, it is determined during step 920 that the cost does not exceed the predefined threshold, then the determined number of simulation runs 655 are generated and stored during step 940.

Figure 10A:
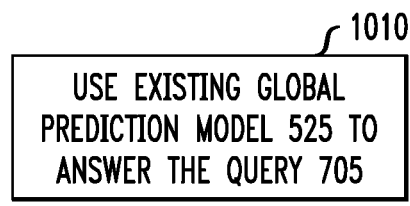
FIGS. 10A-10C illustrate various scenarios for answering a user query encountered by the query execution process of FIG. 8.
Figure 10B:
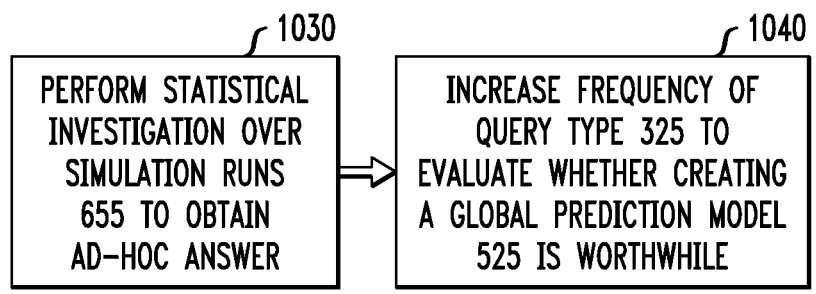
Figure 10C:
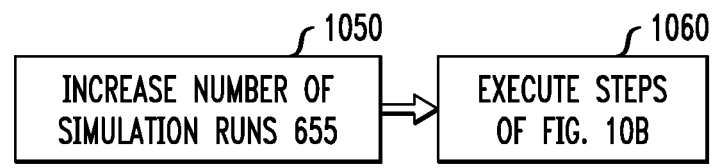

FIGS. 10A-10C illustrate various scenarios for answering a user query 705 encountered by the query execution process 800 of FIG. 8. FIG. 10A is applicable when the query 705 corresponds to a predefined query type 325 and a corresponding prediction model 525 exists for the query type (see also, FIG. 8, step 810, yes branch). As shown in FIG. 10A, in this case, the existing global prediction model 525 is employed during step 1010 to answer the query 705.

FIG. 10B is applicable when the query 705 corresponds to a predefined query type 325 but a corresponding prediction model 525 does not yet exist for the query type 325 but enough simulated data exists (see also, FIG. 8, step 820, yes branch). As shown in FIG. 10B, in this case, a statistical analysis is performed over the simulation runs 655 during step 1030 to obtain an ad-hoc answer to the query 705. The frequency of query type 325 is then increased during step 1040 to evaluate whether creating a global prediction model 525 is worthwhile.

FIG. 10C is applicable when the query 705 corresponds to a predefined query type 325 but neither a corresponding prediction model 525 for the query type 325 nor enough simulated data exists (see also, FIG. 8, step 820, no branch). As shown in FIG. 10C, in this case, the number of simulation runs 655 is increased during step 1050, and then the steps of FIG. 10B are executed during step 1060.

FIG. 11 is a flow chart illustrating an exemplary implementation of a global prediction model generation process 1100 that incorporates aspects of the invention. Generally, the global prediction model generation process 1100 monitors the quality of global prediction models 525 using an evaluation metric, such as accuracy, in the exemplary embodiment. As shown in FIG. 11, the data mining process 324 generates one or more global prediction models. A test is performed during step 1110 to determine if the generated model(s) have sufficient quality, relative to a predefined criteria. If it is determined during step 1110 that the generated model(s) do not have sufficient quality, then additional simulation runs 655 are generated during step 1130 when data mining 324 is repeated to generate the global prediction models.

If, however, it is determined during step 1110 that the generated model(s) have sufficient quality, then the global prediction model(s) 525 are stored into the MPP database during step 1140, to be used to answer user queries 705.

Figure 12:
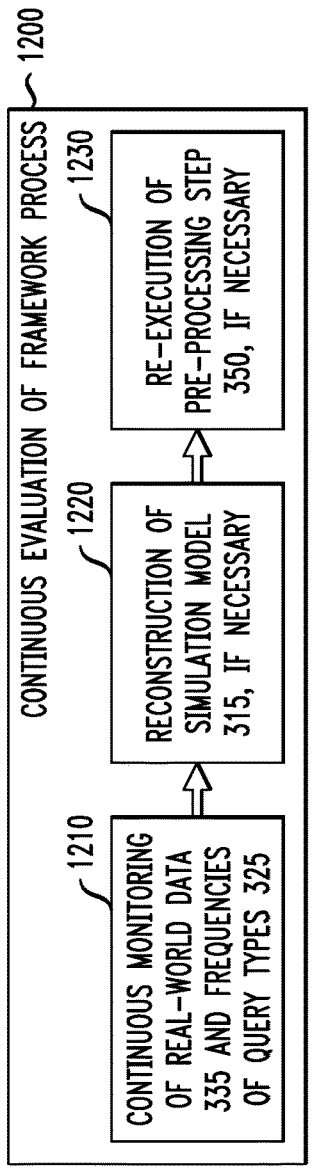
FIG. 12 is a flow chart illustrating an exemplary workflow that implements an evaluation of the framework in accordance with aspects of the invention.

FIG. 12 is a flow chart illustrating an exemplary workflow 1200 that implements an evaluation of the framework in accordance with aspects of the invention. As shown in FIG. 12, the process 1200 continuously monitors the real-world data 335 and frequencies of query types 325 during step 1210. One or more simulation models 315 (along with one or more key feature prediction models 328) are reconstructed during step 1220, if necessary. Simulation models 315 may require reconstruction, for example, if the real-world data 335 substantially changes.

During step 1230, the pre-processing step 350 is re-executed, if necessary. For example, the pre-processing step 350 is re-executed if a simulation model 315 is reconstructed or if there is a significant change in the frequency of a particular query type 325.

The exemplary framework evaluation workflow 1200 recognizes that combinatorial processes 330 have a dynamic nature and real-world data 335 can increase very quickly. Thus, pre-computed simulated data may no longer reflect the reality. The exemplary framework evaluation workflow 1200 continuously refines the simulation models 315, if needed, and continuously refines the pre-computed simulation runs and, consequently, global prediction models 525. In addition, the exemplary framework evaluation workflow 1200 recognizes that initial estimations of frequencies of query types 325 may also change. Thus, the simulation runs are re-computed (or pre-computed) for those queries types 325 whose frequencies have increased above a defined threshold.

Figure 13:
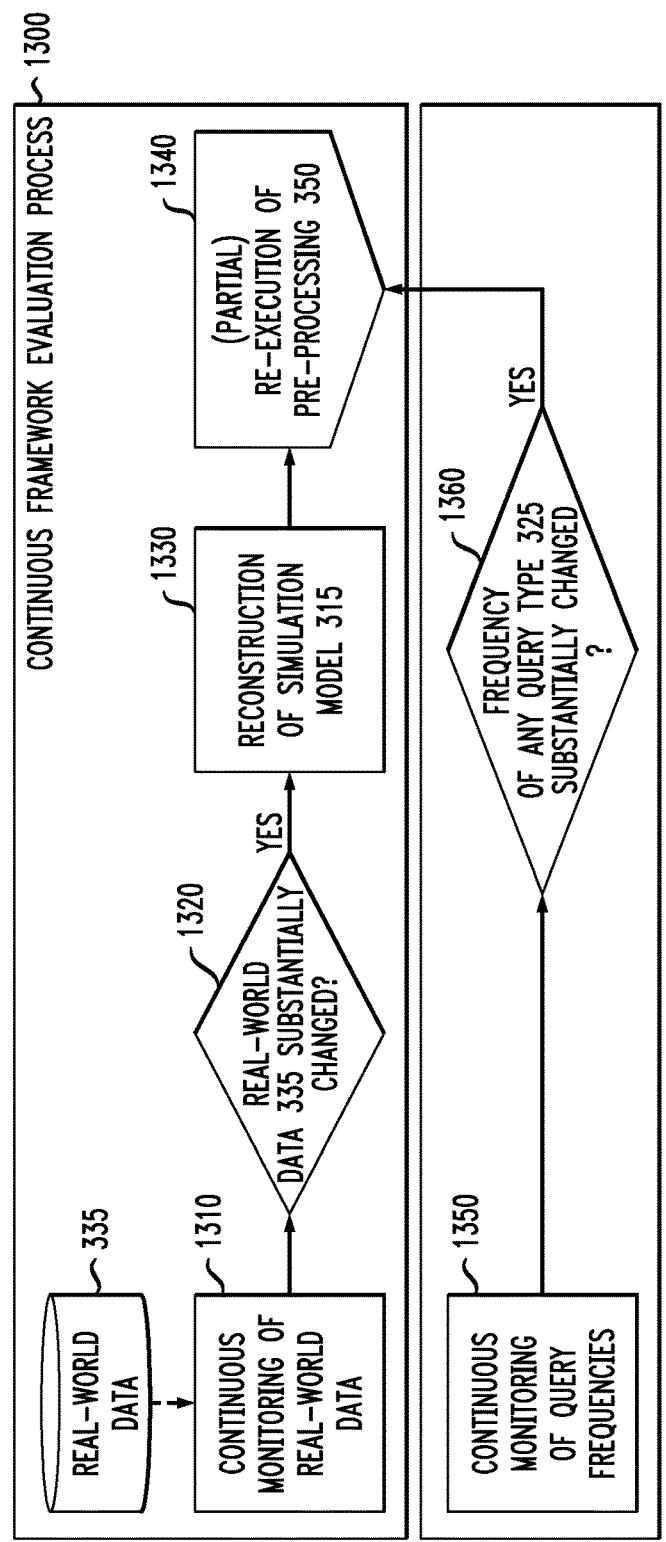
FIG. 13 is a flow chart illustrating an exemplary implementation of a continuous framework evaluation process that implements the workflow of FIG. 12.

FIG. 13 is a flow chart illustrating an exemplary implementation of a continuous framework evaluation process 1300 that implements the workflow 1200 of FIG. 12. As shown in FIG. 13, the exemplary continuous framework evaluation process 1300 monitors the real-world data 335 during step 1310. A test is performed during step 1320 to determine if the real-world data 335 has substantially changed. If it is determined during step 335 that the real-world data 1320 has substantially changed, then the simulation model 315 is reconstructed during step 1330 and the pre-processing step 350 is completely re-executed during step 1340.

In addition, the exemplary continuous framework evaluation process 1300 monitors the frequency of each query type 325 during step 1350. A test is performed during step 1360 to determine if the frequency of any query type 325 without a precomputed global prediction model 525 has substantially changed and achieved a certain threshold. If it is determined during step 1360 that the frequency of any query type 325 without a precomputed global prediction model 525 has changed, then the pre-processing step 350 is (partially) re-executed during step 1340 in order to incorporate new global prediction models 525. Notice that, in this case, previously simulation runs do not need to be discarded, they are taken into account together with new simulation runs 655 created specifically to address the need of creating additional global prediction models.

Architecture

Figure 14:
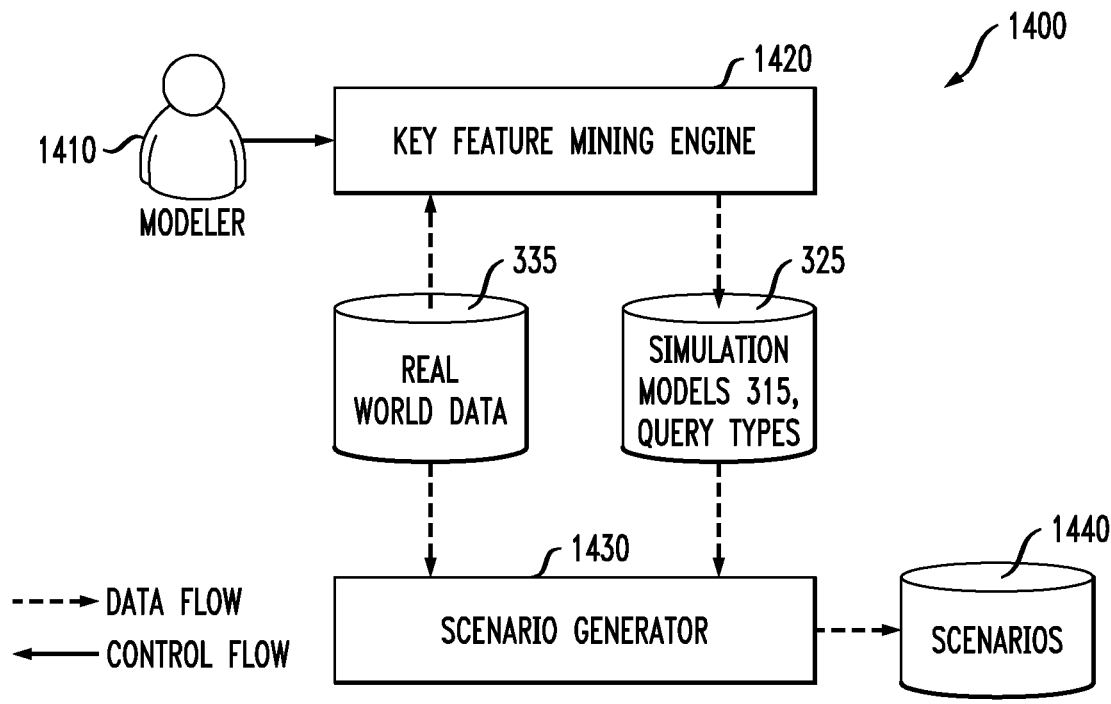
FIGS. 14 through 17 illustrate various exemplary architectures for implementing various aspects of the invention.

FIG. 14 illustrates an exemplary architecture 1400 for generating simulation models 315 of FIG. 3 in accordance with aspects of the invention. As shown in FIG. 14, a human modeler 1410 identifies one or more key features 320 to a key feature mining engine 1420 that implements the data mining 324 of FIG. 3 over real-world data 335, as well as the simulation models 315 and query types 325, to generate one or more key feature prediction models 328. A scenario generator 1430 generates and stores in a store 1440 a set of scenarios to serve as input for the simulator (1510, FIG. 15).

Figure 15:
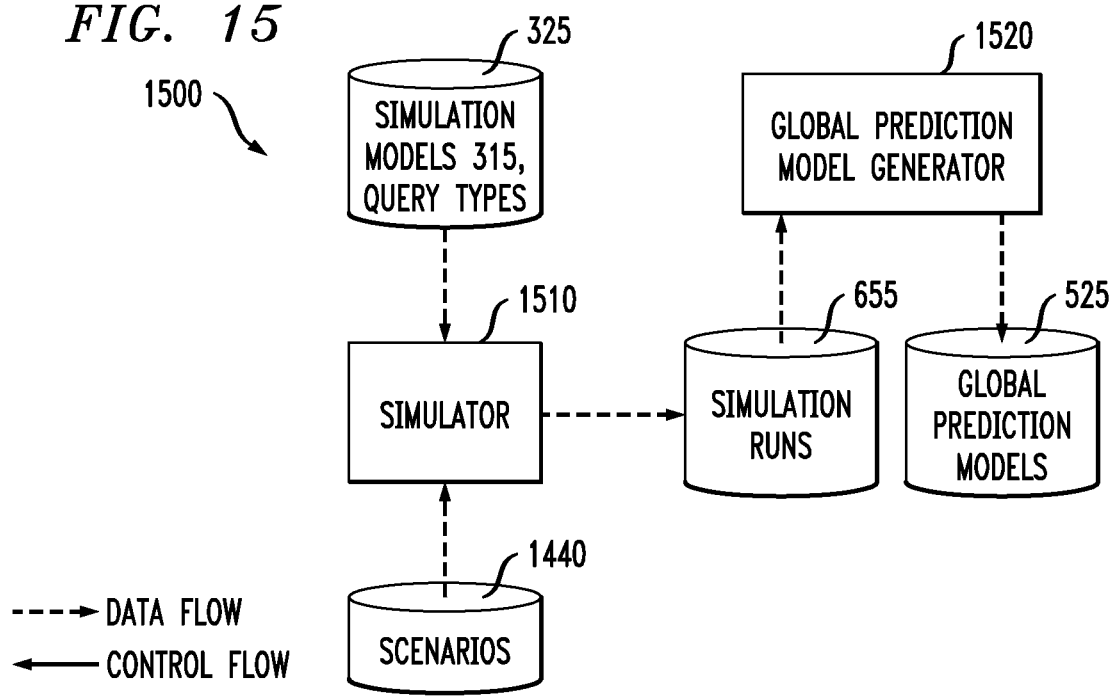

FIG. 15 illustrates an exemplary architecture 1500 for performing the pre-processing steps 350 of FIG. 3 in accordance with aspects of the invention. As shown in FIG. 15, a simulator 1510 processes the simulation models 315 and query types 325, as well as the scenarios 1440 to generate the simulation runs 655 that are used by a global prediction model generator 1520 to generate the global prediction models 525.

Figure 16:
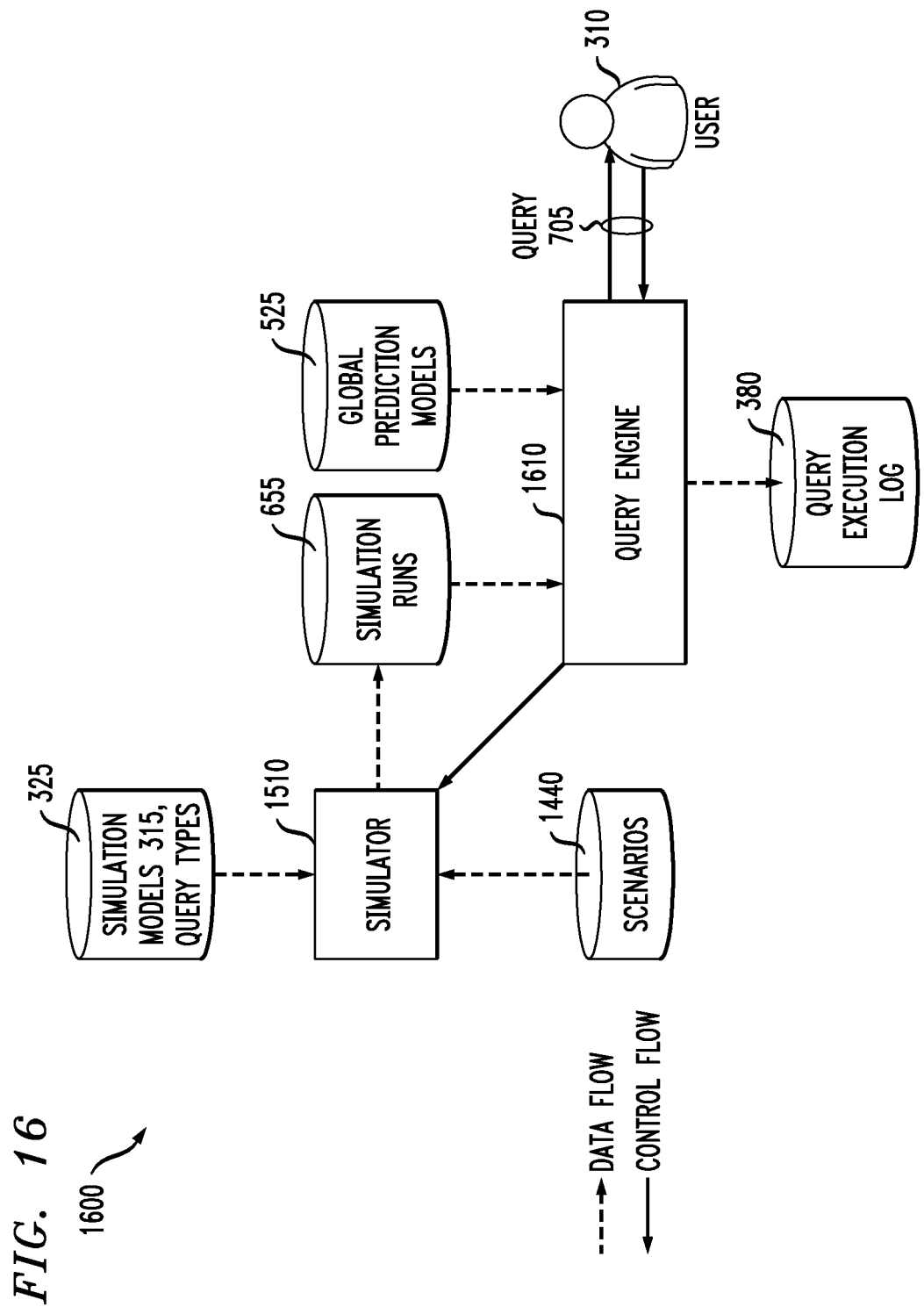

FIG. 16 illustrates an exemplary architecture 1600 for executing queries in accordance with aspects of the invention. As shown in FIG. 16, a user 310 provides a query 705 to a query engine 1610. The query engine 1610 processes the query 705 based on the simulation runs 655 and global prediction models 525, in the manner described above. It is noted that the simulator 1510 is not active in the exemplary architecture 1600 of FIG. 16 but may be activated, for example, if a global prediction model 525 does not already exist for the query type 325 of the submitted query 705.

Figure 17:
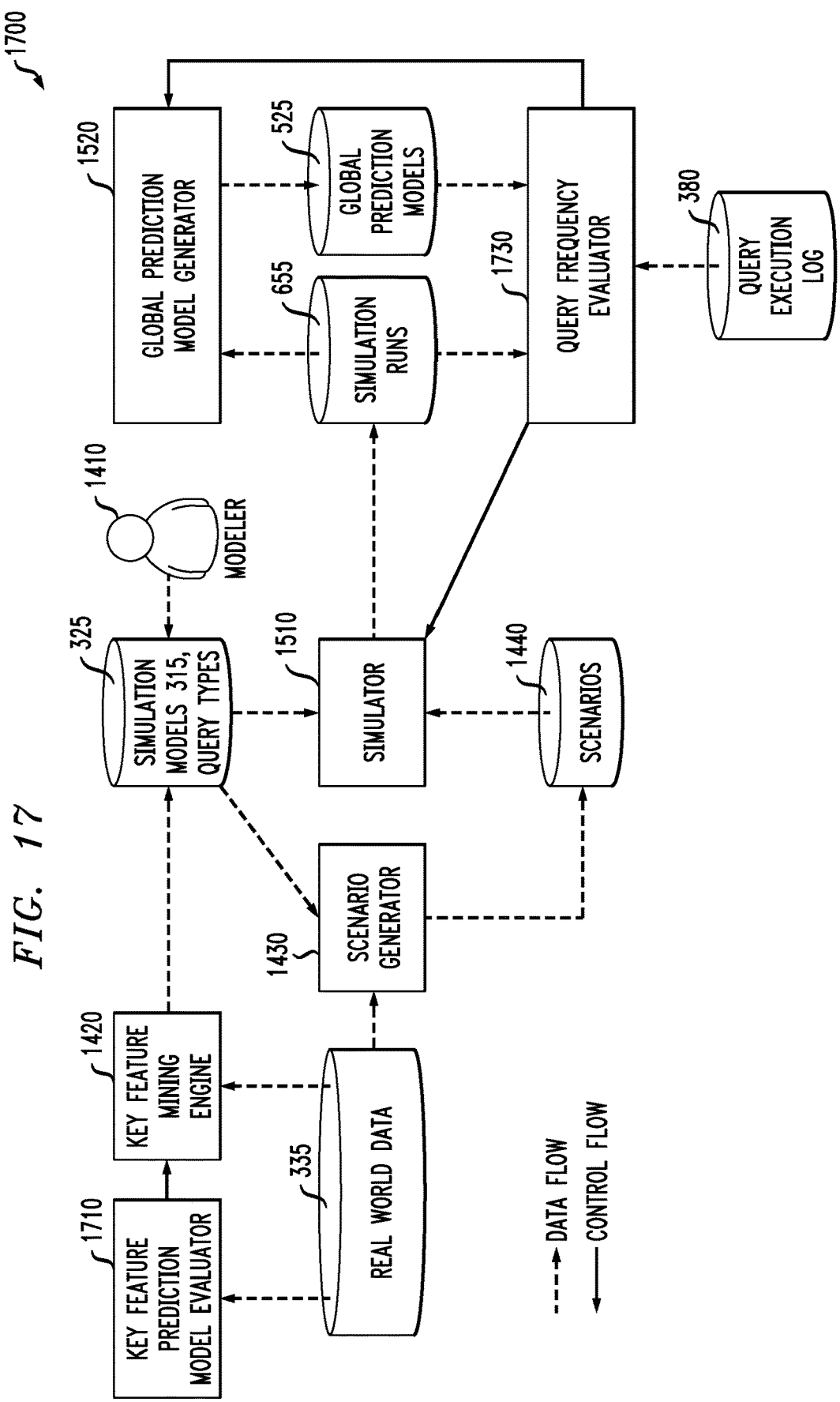

FIG. 17 illustrates an exemplary architecture 1700 for the continuous evaluation of the framework in accordance with aspects of the invention. As shown in FIG. 17, a key feature prediction model evaluator 1710 monitors the real-world data 335 and upon a significant change, the key feature prediction model evaluator 1710 will activate the key feature mining engine 1420 to reconstruct the simulation model 315 and re-execute the pre-processing 350.

In addition, a query frequency evaluator 1730 monitors the frequency of query types 325 in the query execution log 380, and if the frequency of any particular query type 325 increases above a predefined threshold, the query frequency evaluator 1730 will activate the creation of a new global prediction model for this query type. Depending on the current set of simulation runs, the global prediction model generator 1520 can be immediately activated to generate such a model. If, however, the set of simulation runs do not support the creation of the global prediction model 525, the simulator 1510 is activated to generate additional simulation runs and then a global prediction model 525 for the particular query type 325 is generated, using the global prediction model generator 1520, as discussed above in conjunction with FIG. 15.

EXAMPLES

Example 1: Answering Queries with Precomputed Predictive Model

Suppose that, in the context of logistics processes for oil and gas exploration and production, the user is interested in a query 705 that demands the average lead time of a specific material (i.e., the material is a constraint of the query 705) from a given warehouse to a given oil platform. During the pre-processing step 350, the simulation results needed to answer this type of query 705 are generated in parallel within the MPP database. The results are stored into the database as well, and accurate global predictive models 525 (e.g., one model for each of the top k most demanded materials) are created, taking into account the most relevant features to estimate the lead time. In this way, whenever this query type 325 is posed by the user 310, with a given material as a constraint, the framework applies the corresponding global predictive model 525 in order to provide the answer.

If, instead of using the disclosed integrated approach, only simulation techniques were employed, the results might take a long time to be computed. This would be the case, in particular, if the scenario corresponded to orders regarding tens of thousands of different materials, with all orders being able to impact the lead time of each other. On the other hand, if complete global prediction models 525 are used based only on real-world data 335, the answer could not take into account all possibilities. By using the integrated approach, the decision-making capabilities are leveraged, by timely and accurately answering complex queries.

Example 2: Answering Queries with New Simulation Results

As another example, suppose that the user 310 poses the type of query described in Example 1, using as a constraint a material for which there are no (or few) precomputed simulations (e.g., a rarely demanded material). In this scenario, the framework needs to generate new (or additional) simulation results related to this material, and a statistical analysis is performed in order to provide an ad-hoc answer. The framework increases the frequency of the corresponding query type 325 so as to evaluate whether pre-computing a global prediction model 525 to answer future queries of the same type would be advantageous.

The ability to dynamically increase the number of simulation runs 655 is essential to avoid the need of pre-computing and storing a very large number of unnecessary simulation runs 655.

Example 3: Answering Queries with a New Predictive Model

Now, suppose that the user 310 would repeatedly like to know the average lead time of highly-demanded materials but restricted to situations when an "out-of-stock" level is reached and the orders cannot be immediately processed. A global prediction model 525 to answer this specific kind of query might not be available, so that additional simulation runs 655 are generated and ad-hoc answers are computed on-the-fly as in Example 2. It might be the case that the frequency of queries of this query type 325 reaches a predefined threshold. In this case, the pre-processing to create the global prediction model 525 for this query type 325 is triggered. The framework then increases the number of simulation runs 655 and performs data mining 324 on the complete set of simulation runs 655 to generate a global prediction model 525. The next time a query of this type is executed, the answer will be computed almost instantaneously using the new global prediction model 525.

Example 4: Need to Import Real-World Data

Suppose that it has been a long time since the framework last created the predictive models 525 to answer the user-defined queries 705. In this case, the current constructed predictive models 525 no longer reflect the reality. In this case, the framework should load new real-world data 335; refine the simulation models 315 by incorporating new key feature predictive models 328 that estimate key features 320; delete old simulation results; generate new simulation results related to the user-defined query types 325; and build new global predictive models for the query types 325 in question.

The ability to automatically update the models based on new real-world data is important due to the fact that scenarios tend to be very dynamic.

Among other benefits, aspects of the present invention, when applied to logistics processes in oil and gas exploration and production, can predict lead times taking possible scenarios into consideration; identify and fix bottlenecks; reduce risk of interruption of production; and establish cost-effective stock levels (e.g., minimal but safe). For example, a potential analysis can determine that a reduction of assets in inventory by 20% can provide a cost savings of approximately $120M/year. In a further variation, a potential analysis can determine that a reduction in the number of days without production can have a value measured in thousands of oil barrels.

CONCLUSION

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each module embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 18:
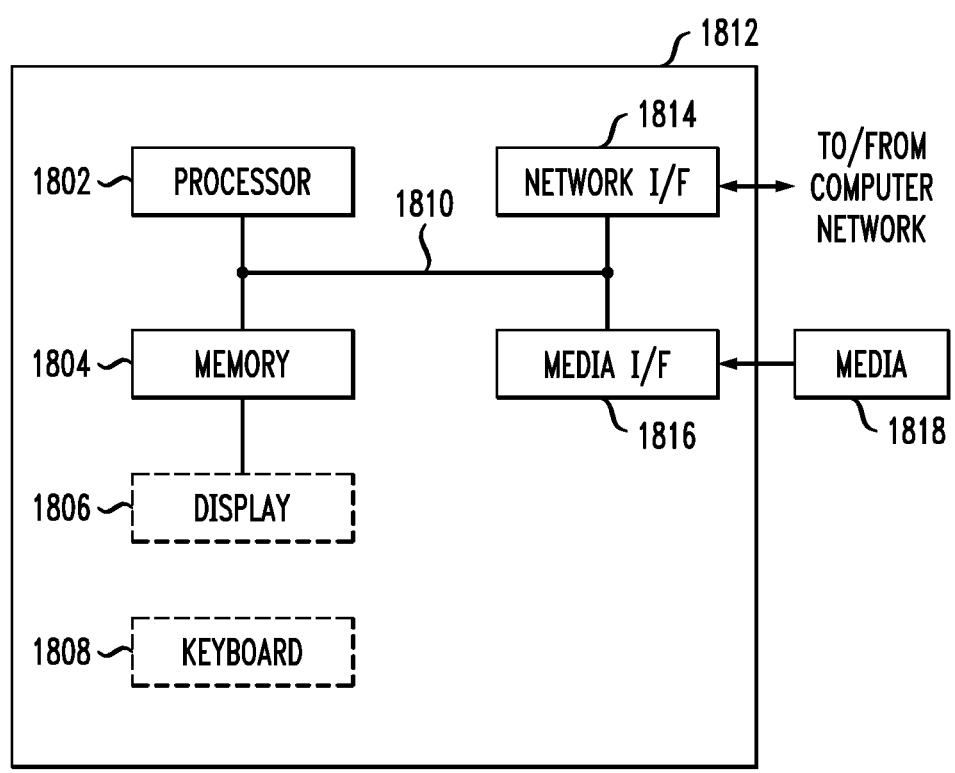
FIG. 18 is a system diagram of an exemplary computer system on which at least one embodiment of the invention can be implemented.

By way of example, an aspect of the present invention can make use of software running on a general purpose computer. FIG. 18 is a system diagram of an exemplary computer system on which at least one embodiment of the invention can be implemented. As depicted in FIG. 18, an example implementation employs, for example, a processor 1802, a memory 1804, and an input/output interface formed, for example, by a display 1806 and a keyboard 1808. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 1802, memory 1804, and input/output interface such as display 1806 and keyboard 1808 can be interconnected, for example, via bus 1810 as part of a data processing unit 1812. Suitable interconnections via bus 1810, can also be provided to a network interface 1814 (such as a network card), which can be provided to interface with a computer network, and to a media interface 1816 (such as a diskette or compact disc read-only memory (CD-ROM) drive), which can be provided to interface with media 1818.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1802 coupled directly or indirectly to memory elements 1804 through a system bus 1810. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1808, displays 1806, and pointing devices, can be coupled to the system either directly (such as via bus 1810) or through intervening I/O controllers.

Network adapters such as network interface 1814 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1812 as depicted in FIG. 18) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD- ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from improved analytical processing of provenance data. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
performing the following first steps:
generating, using at least one processing device, a simulation model that simulates one or more steps of a combinatorial process, wherein said simulation model comprises one or more key features of said combinatorial process;
performing, using said at least one processing device, a plurality of first data mining tasks in parallel over real data of said combinatorial process to obtain one or more key feature prediction models that estimate said one or more key features;
binding said one or more key feature prediction models to said simulation model;
identifying one or more query types;
generating, in parallel, using said at least one processing device, a plurality of simulation runs comprising simulated data for said one or more query types; and
performing, using said at least one processing device, a plurality of second data mining tasks in parallel over said plurality of simulation runs to build one or more global prediction models to answer queries of each of said one or more query types; and
performing the following second steps, subsequent to the first steps and in response to obtaining a submitted user query, wherein the submitted user query is an instance of a particular query type and comprises one or more specified parameters of the particular query type:
updating a frequency counter for the particular query type;
determining whether additional simulation runs are needed to process the submitted user query based at least in part on an evaluation of a number of the simulation runs available from the first steps that processed at least one of the one or more specified parameters of the particular query type;
dynamically generating one or more additional simulation runs comprising additional simulated data for the at least one specified parameter of the particular query type responsive to the determining that additional simulation runs are needed;
performing a statistical analysis on the additional simulation data generated by the one or more additional simulation runs;
determining an answer to the submitted user query by selectively using one or more of (i) said one or more global prediction models from the first steps and (ii) the statistical analysis from the second steps; and
in response to the frequency counter of the particular query type exceeding a threshold, performing said plurality of second data mining tasks in parallel over said plurality of additional simulation runs to obtain a global prediction model to answer a future submitted user query of said particular query type.

2. The method of claim 1, wherein said step of determining said answer to said user query further comprises applying statistical analysis techniques to simulation data in said plurality of simulation runs to answer said user query if there is no global prediction model for the particular query type.

3. The method of claim 1, wherein said determining whether additional simulation runs are needed further comprises generating said one or more additional simulation runs responsive to a determination that there is no global prediction model for the particular query type and an existing plurality of simulation runs are not sufficient.

4. The method of claim 1, wherein said step of generating, in parallel, said plurality of simulation runs comprising simulated data for said one or more query types further comprises a previous step of reducing a number of said query types if a cost for generating said simulation runs does not satisfy one or more predefined criteria.

5. The method of claim 1, wherein said step of performing said plurality of second data mining tasks in parallel over said plurality of simulation runs generates one or more global prediction models that satisfy one or more predefined quality criteria.

6. The method of claim 5, further comprising repeating said steps of generating, in parallel, a plurality of additional simulation runs and performing said plurality of second data mining tasks in parallel over said plurality of simulation runs until said one or more global prediction models satisfy said predefined quality criteria.

7. The method of claim 1, wherein the identifying the one or more query types further comprises monitoring a frequency that queries for each query type are executed and, when a frequency of a given query type without a corresponding prediction model exceeds a previously specified criteria, generating additional simulation runs and performing said plurality of second data mining tasks in parallel over said plurality of additional simulation runs to obtain a global prediction model to answer queries of said given query type.

8. The method of claim 1, further comprising the step of monitoring a compatibility of key feature prediction models with said real data of said combinatorial process, and when one or more of the key feature prediction models are not compatible with said real data of said combinatorial process according to one or more predefined quality criteria, re-executing the following steps:
  performing said plurality of said first data mining tasks in parallel over said real data of said combinatorial process to obtain said one or more key feature prediction models that estimate said one or more key features;
  binding said one or more key feature prediction models to said simulation model;
  generating, in parallel, a plurality of simulation runs comprising simulated data for said one or more query types; and
  performing said plurality of second data mining tasks in parallel over said plurality of simulation runs to build one or more global prediction models to answer queries of each of said one or more query types.

9. A computer program product comprising a non-transitory machine-readable storage medium having encoded therein executable code of one or more software programs, wherein the one or more software programs when executed perform the steps of the method of claim 1.

10. The method of claim 1, further comprising monitoring a frequency that submitted user queries for each query type are executed and, when a frequency of a given query type exceeds a previously specified criteria, performing said plurality of second data mining tasks in parallel over said plurality of additional simulation runs to obtain a global prediction model to answer a submitted user query of said given query type.

11. The method of claim 1, further comprising updating one or more of the key feature prediction models and the global prediction models based at least in part on an availability of new real data of said combinatorial process.

12. A system, comprising:
  a memory; and
  at least one processing device, coupled to the memory, operative to implement the following steps:
  performing the following first steps:
    generating, using at least one processing device, a simulation model that simulates one or more steps of a combinatorial process, wherein said simulation model comprises one or more key features of said combinatorial process;
    performing, using said at least one processing device, a plurality of first data mining tasks in parallel over real data of said combinatorial process to obtain one or more key feature prediction models that estimate said one or more key features;
    binding said one or more key feature prediction models to said simulation model;
    identifying one or more query types;
    generating, in parallel, using said at least one processing device, a plurality of simulation runs comprising simulated data for said one or more query types; and
    performing, using said at least one processing device, a plurality of second data mining tasks in parallel over said plurality of simulation runs to build one or more global prediction models to answer queries of each of said one or more query types; and
  performing the following second steps, subsequent to the first steps and in response to obtaining a submitted user query, wherein the submitted user query is an instance of a particular query type and comprises one or more specified parameters of the particular query type:
    updating a frequency counter for the particular query type;
    determining whether additional simulation runs are needed to process the submitted user query based at least in part on an evaluation of a number of the simulation runs available from the first steps that processed at least one of the one or more specified parameters of the particular query type;
    dynamically generating one or more additional simulation runs comprising additional simulated data for the at least one specified parameter of the particular query type responsive to the determining that additional simulation runs are needed;
    performing a statistical analysis on the additional simulation data generated by the one or more additional simulation runs;
    determining an answer to the submitted user query by selectively using one or more of (i) said one or more global prediction models from the first steps and (ii) the statistical analysis from the second steps; and
    in response to the frequency counter of the particular query type exceeding a threshold, performing said plurality of second data mining tasks in parallel over said plurality of additional simulation runs to obtain a global prediction model to answer a future submitted user query of said particular query type.

13. The system of claim 12, wherein said step of determining said answer to said user query further comprises applying statistical analysis techniques to simulation data in said plurality of simulation runs to answer said user query if there is no global prediction model for the particular query type.

14. The system of claim 12 wherein said determining whether additional simulation runs are needed further comprises generating said one or more additional simulation runs responsive to a determination that there is no global prediction model for the particular query type and existing plurality of simulation runs are not sufficient.

15. The system of claim 12, wherein said step of generating, in parallel, said plurality of simulation runs comprising simulated data for said one or more query types further comprises a previous step of reducing a number of said query types if a cost for generating said simulation runs does not satisfy one or more predefined criteria.

16. The system of claim 12, wherein said step of performing said plurality of second data mining tasks in parallel over said plurality of simulation runs generates one or more global prediction models that satisfy one or more predefined quality criteria and further comprising repeating said steps of generating, in parallel, a plurality of additional simulation runs and performing said plurality of second data mining tasks in parallel over said plurality of simulation runs until said one or more global prediction models satisfy said predefined quality criteria.

17. The system of claim 12, wherein the identifying the one or more query types further comprises monitoring a frequency that queries for each query type are executed and, when a frequency of a given query type without a corresponding prediction model exceeds a previously specified criteria, generating additional simulation runs and performing said plurality of second data mining tasks in parallel over said plurality of additional simulation runs to obtain a global prediction model to answer queries of said given query type.

18. The system of claim 12, wherein said step of determining said answer to said user query further comprises applying statistical analysis techniques to simulation data in said plurality of simulation runs to answer said user query if there is no global prediction model for the particular query type.

19. The system of claim 12, further comprising monitoring a frequency that submitted user queries for each query type are executed and, when a frequency of a given query type exceeds a previously specified criteria, performing said plurality of second data mining tasks in parallel over said plurality of additional simulation runs to obtain a global prediction model to answer a submitted user query of said given query type.

20. The system of claim 12, further comprising updating one or more of the key feature prediction models and the global prediction models based at least in part on an availability of new real data of said combinatorial process.

* * * * *